United States Patent

Klowden

[11] 3,881,873
[45] May 6, 1975

[54] MOISTURE INDICATING PROBE AND METHOD OF USE

[76] Inventor: Iris B. Klowden, 1146 Center Ct., Homewood, Ill. 60430

[22] Filed: Apr. 29, 1974

[21] Appl. No.: 465,106

[52] U.S. Cl............. 23/253 TP; 23/230 R; 23/259; 73/73; 116/114 AM
[51] Int. Cl...................... G01n 33/18; G01n 21/06
[58] Field of Search............ 23/253 TP, 259, 230 R; 73/73; 116/114 AM

[56] References Cited
UNITED STATES PATENTS

| | | | |
|---|---|---|---|
| 2,787,238 | 4/1957 | Luce | 23/253 TP |
| 3,019,638 | 2/1962 | Klein | 73/73 |
| 3,084,658 | 4/1963 | Schell | 23/253 TP |
| 3,117,442 | 1/1964 | Brooks | 116/114 AM |
| 3,702,755 | 11/1972 | Palmer | 23/253 TP |

*Primary Examiner*—R. E. Serwin
*Attorney, Agent, or Firm*—Kegan, Kegan & Berkman

[57] ABSTRACT

A moisture testing and indicating device for a planter, potted plant and the like constituting a probe coated at the lower portion thereof with a chemical agent such as cobaltous chloride which undergoes color change as function of water or water vapor present, whereby, by inserting a dry probe into the soil of a potted plant and then withdrawing and examining the moisture-sensitive coating on the probe, one can readily determine whether the soil is still wet, or whether the soil is dry and that the plant should be watered.

7 Claims, 2 Drawing Figures

PATENTED MAY 6 1975 3,881,873

MOISTURE INDICATING PROBE AND METHOD OF USE

BACKGROUND OF THE INVENTION

The question of when and when not to water a potted plant or planter is one which has long perplexed both the technically unsophisticated householder and the more experienced professional plant grower of florist. It is known that a principal cause of plant failure is improper watering, particularly overwatering.

The need for a reliable testing and indicating device which may be used to ascertain the existing soil condition insofar as moisture content is concerned has been long recognized, and many types of apparatus and techniques have been suggested as possible answers to this need. Many of the moisture-responsive or moisture-sensitive indicators which have been developed are unduly complicated, cumbersome, unreliable, or difficult to use and interpret. Others are slow to respond to the existing conditions and lack the required practicability. Still others are inherently too costly to be economical. None of the prior art devices is completely satisfactory for the intended use. It is therefore, the aim of the present invention to obviate the shortcomings of the prior art mechanisms and techniques by providing a simple, low-cost, yet highly effective and reliable device which can quickly and readily be used to determine both the need for or the adequacy of moisture in the soil of a potted plant.

It is a principal object of the invention to provide a simple moisture testing device which may be reliably used by both the experienced plant grower and the "amateur" to give a positive indication of the moisture condition of the soil in a planter, potted plant, or similar container for growing plants and the like.

A related object of the invention is to provide a simple apparatus whereby one may easily measure the moisture present in the soil of a potted plant in that region adjacent the plant roots.

It is a general object of the invention to provide a simple yet reliable device which may easily be used to determine, for a potted plant, when water addition is in order.

A related object of the invention is to obviate the undesirable "overwatering" of plants.

A more specific object of the invention is to provide a moisture-indicating device which includes means for producing a visible, readily detectable, color change correlated with a condition of water concentration.

Yet another object of the invention is to provide a simple device and a simple and rapid testing technique whereby the relative water concentration contained in the soil of the potted plant may be effectively determined without disturbing the root structure of that plant.

It is a feature of the invention that the moisture testing device may be reused for at least several independent determinations.

The device of the present invention constitutes an inexpensive and reliable test and monitoring apparatus for sensing and indicating the moisture condition in the soil of a potted plant, and requires no special training or expertise in use.

SUMMARY OF THE INVENTION

In accordance with the practice of the invention there is provided a moisture-responsive device consisting of a probe impregnated or coated with a water-sensing chemical agent. In a preferred embodiment of the invention the chemical agent is of the type which exhibits one color when in a dry state and a different, contrasting color when moist or wet.

The probe itself is preferably of wood or a similar cellular or absorptive material and is physically dimensioned so as to be insertable into the soil of a potted plant without objectionably disturbing the root structure. A preferred physical configuration of the probe is that of a blade-like pallet or stick about 8 inches long, five-eighths of an inch wide, and about one-sixteenth of an inch thick. The lower portion, encompassing about one-third of the overall height or length of the stick is coated or otherwise treated with the water-sensitive chemical indicator. Details as to the mode of fabrication of the indicator of the device and the manner in which its features contribute to and achieve the purposes of the invention are set forth more fully in the paragraphs below and will be understood from the following descriptive material considered in conjunction with the drawings.

BRIEF DESCRIPTION OF THE DRAWINGS

The invention is described more fully and in greater detail herebelow by way of a specific example with reference to the accompanying drawings in which.

DESCRIPTION OF PREFERRED EMBODIMENT

Figure 1:
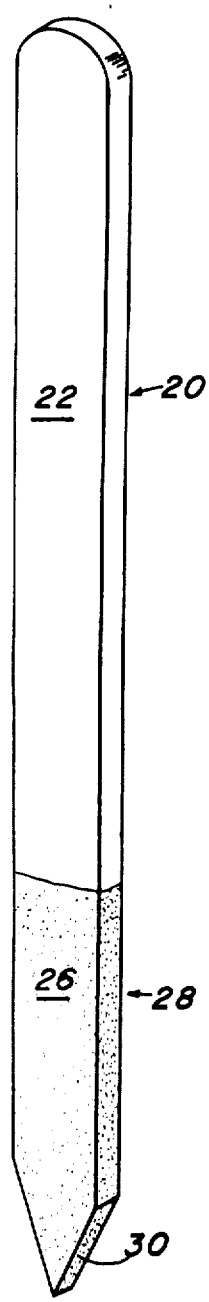
FIG. 1 is a perspective view of a probe coated with a moisture-sensitive agent, in accordance with the invention.

In accordance with the preferred embodiment of the invention, the aims and objects are accomplished, as indicated schmetically in FIG. 1, by providing a moisture indicating device 20 consisting of an elongated, blade-like, flattened probe 22 which carries at its lower portion a deposit 26 of a chemical agent covering the perimetric base zone 28 of the probe 22.

Figure 2:
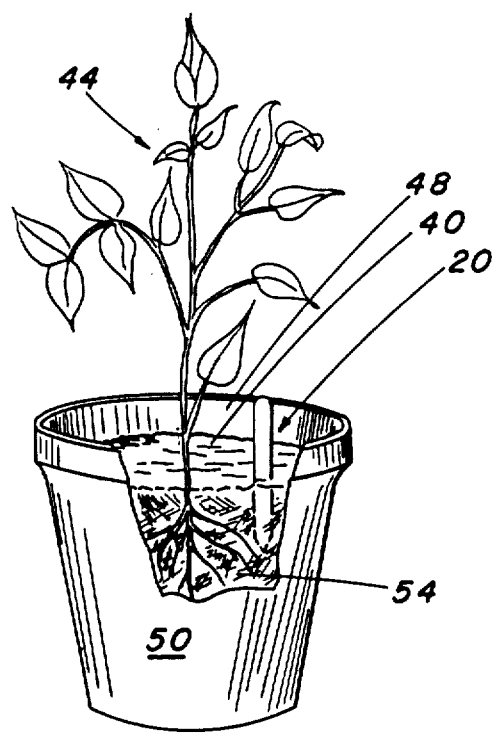
FIG. 2 shows, schematically, the probe as used in testing the soil of a potted plant.

Although the particular physical configuration of the device 20 is not critical, in the preferred embodiment depicted the lower extremity of the probe 22 is sharpened or pointed 30 to ease the physical insertion or thrusting of the probe 22 into the soil 40 of the potted plant 44 as indicated schematically in FIG. 2. In use, the probe is preferably inserted downwardly along the inside wall face 48 of the flower pot, planter, or equivalent container 50, the depth of insertion being aimed to correspond to the position of the roots 54 of the plant 44. In accordance with the concept of the invention, the probe is fabricated of a material such as wood which is receptive to the deposition of a chemical agent such as a salt of the type which is sensitive to and undergoes visible color changes as a function of moisture concentration. It has been found that pine, including white pine and yellow pine, is a preferred wood, not only from a cost consideration, but also because of its physical-chemical properties. Specifically, it has been found that pine is specially suitable both by its natural color and by its porosity characteristics and cell structure for infusion of aqueous salt solutions of the type finding utility in the practice of the invention. Other suitable woods include birch, cedar, spruce, and balsa, these being preferred, for the purposes of the invention, to woods such as oak, mahogany, red wood, or poplar.

While any chemical agent of the type exhibiting different colors as a function of moisture may be used in the practice of the invention, in the preferred embodiment described the chemical agent is cobaltous chloride ($CoCl_2$), this salt having been selected because of its well defined blue color in the dry state and its light pink or almost colorless hue when damp or wet. Additionally, the cobaltous chloride salt has extremely low toxicity, rendering its use safe.

In fabricating the moisture indicator or sensor device 20 of the invention, the blade-like probe 22 is dipped into a solution containing, as a dissolved solute, the chemical composition selected as the indicator, an aqueous solution of cobalt chloride being preferred. The solution concentration of cobaltous chloride is fairly critical, concentrations of about 2% to about 5% by weight of the salt having utility. Concentrations in the range of about 2½% to about 4% by weight are especially useful, and a concentration of about 3% by weight is preferred.

The temperature of the dipping solution is conveniently room temperature, although slightly elevated solution temperatures may enhance the infusion and impregnation of the probe body. The probe 22 is dipped or immersed into the cobaltous chloride solution to about one-third or one-fourth of its length for a short time period in the range of about 5 to 10 seconds. It is then withdrawn and dried. Air drying in the ambient atmosphere is an acceptable technique, although in the preferred method of the invention, the treated stick is oven dried at about 350°F for about 1 minute. When dry, the stick carries a visible deposit 26 which appears as a blue coloration at the base, dipped portion of the probe 22. The moisture sensor, thus prepared, is ready for use.

The method of using the moisture indicating probe of the invention will be evident upon a consideration of the foregoing descriptive material. However, the following specific use procedure is set forth as preferred. In using the device of the invention as a sensor to indicate the moisture condition of the soil in a potted plant, it is necessary merely to insert the probe 22 downwardly into the soil 40 of the potted plant 44 to a depth such that the lower extremity of the probe is near the roots 54 of the plant. It will be appreciated that just prior to insertion of the probe the chemical coating is in its "dry" state and is clearly visible on the probe 22 as a blue-colored deposit 26. After a relatively short dwell period (about 5 seconds) in the soil 40, the probe 22 is withdrawn and that portion of the probe which carries the deposit 26 is examined visually. If the soil tested was dry the moisture-sensitive deposit 26 of cobaltous chloride will have been essentially unaffected and will still be visible as a blue-colored coating. If, however, the soil into which the probe 22 had been thrust was moist or "wet", the probe will no longer be blue since the cobaltous chloride will have "sensed" the moisture and would have reacted to assume its essentially colorless form. Under the latter condition, no watering is necessary.

In practice, each probe prepared and used in accordance with the teachings of the invention may be reused several times with reliable results. It is necessary merely to allow the probe fully to dry between usees, such drying being indicated by the "return" of the blue color to the coated portion of the probe. When not in use, the probe should be stored in a dry place and protected from excessive physical abrasion. If, in its dry state, the probe no longer exhibits the blue color characteristic of dry cobaltous chloride, the probe should be discarded and a new probe used.

It will be appreciated that the present invention provides a simple yet highly effective test apparatus for detecting or sensing the moisture condition in the soil of a potted plant. The testing procedure is easily carried out and requires no special tools or technical expertise.

While preferred embodiments of the moisture indicator of the invention have been illustrated and described, it is understood that the same is capable of modification and that such modifications may be made without departure from the spirit and scope of the invention as defined in the appended claims.

What is claimed is:

1. A moisture indicating single-element device adapted for forced insertion directly into the soil of a potted plant and moisture-sensitive to undergo a visible color change in response to moisture present in said soil, thereby to provide an indication of the moisture condition of the soil, said device comprising, in combination, an elongated, longitudinally-rigid probe of wood and similar compositions including fiber board and other cellular-structured materials, said probe being further characterized by mechanical strength sufficient to permit forced manual insertion of said probe downwardly into the soil of a potted plant and the like to a region near the roots thereof, a chemical agent deposited on and carried by said probe in a perimetric base zone thereof for direct contact with the soil of a potted plant, said agent being adhered to said probe so as to resist premature physical dislodgment of said agent from said probe when the probe is thrust into the soil, said chemical agent being sensitive to moisture to undergo color change, and characterized in assuming one color when dry and a different color when moistened, whereby, upon insertion of said probe and said agent carried thereby into and withdrawl of said probe and probe-carried agent from the soil of a potted plant, there is provided a visual indication to denote, for either existing condition, the presence of and the need for added water.

2. The device as set forth in claim 1 wherein said probe consists essentially of a blade-like wooden shaft having a pair of opposed generally parallel and generally planar outer bounding principal walls, said walls constituting indicator surfaces of said device thereby visually to denote by the particular color displayed the moisture condition of a test medium such as soil to which said probe has been intimately exposed.

3. The device as set forth in claim 1 wherein said chemical agent carried on said probe comprises a solid residue deposited from an evaporated aqueous solution of cobaltous chloride, said solution containing said cobaltous chloride as a solute in a concentration from about 2% to 5% by weight.

4. The device as set forth in claim 3 wherein said chemical agent carried on said probe comprises a solid residue deposited from an evaporated aqueous solution of cobaltous chloride, said solution containing said cobaltous chloride as a solute in a concentration from about 2½% to about 4% by weight.

5. The device as set forth in claim 2 wherein said probe is made of pine.

6. The device as set forth in claim 2 wherein said probe is made of birch.

7. The method of making a quantitatively meaningful determination of the moisture concentration in the soil of a potted plant to establish empirically whether water should be added to the soil in which the plant is potted, said method comprising the steps of:

immersing a probe in a solution containing a solute consisting essentially of cobaltous chloride in a concentration in the range of from about 2% to about 5% by weight, thereby to wet and partially impregnate said probe with said solution, withdrawing said probe from said solution and drying said probe to form thereon a visible deposit of cobaltous chloride to serve as a moisture indicator coating on said probe, inserting the coated probe into the soil of a potted plant to a region near roots of said plant, maintaining said probe in the soil of the potted plant for a dwell period of at least about 3 seconds to expose said cobaltous chloride to moisture conditions existing within said soil, withdrawing said probe from said soil and visually examining said probe to determine any change in the color of the cobaltous chloride coating thereon, thereby to establish any need to add water to the potted plant, said need being indicated by a disappearance of blue coloration from the cobaltous chloride deposit on said probe.

* * * * *